Dec. 12, 1933.  H. L. SCHRECK  1,939,140
FLYING SHEARS
Filed July 8, 1932   3 Sheets-Sheet 1
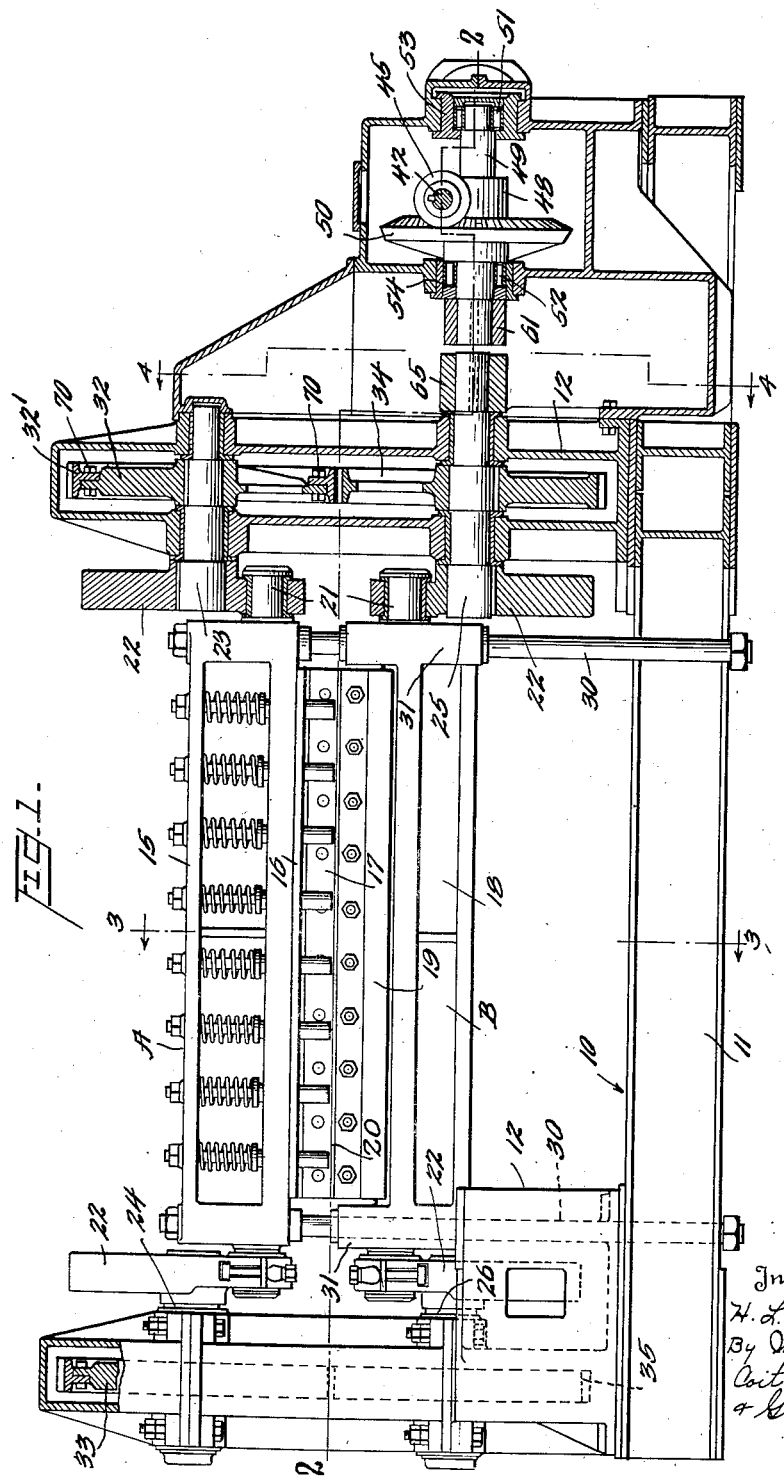
Inventor
H. L. Schreck
By Watson,
Coit, Morse
& Grindle
Attorneys Dec. 12, 1933.  H. L. SCHRECK  1,939,140
FLYING SHEARS
Filed July 8, 1932    3 Sheets-Sheet 2
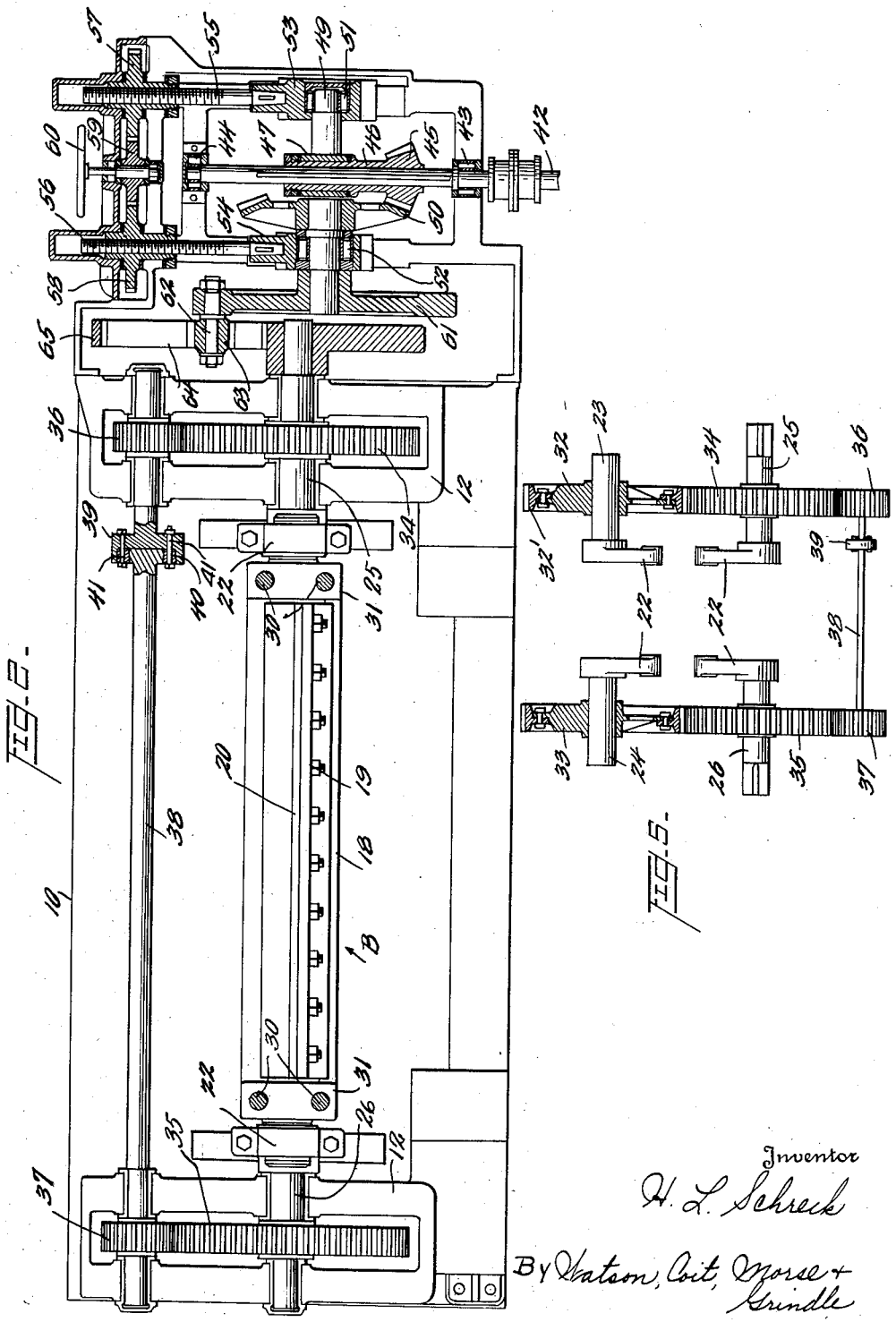
Inventor
H. L. Schreck
By Watson, Coit, Morse & Grindle
Attorneys Dec. 12, 1933.  H. L. SCHRECK  1,939,140
FLYING SHEARS
Filed July 8, 1932   3 Sheets-Sheet 3
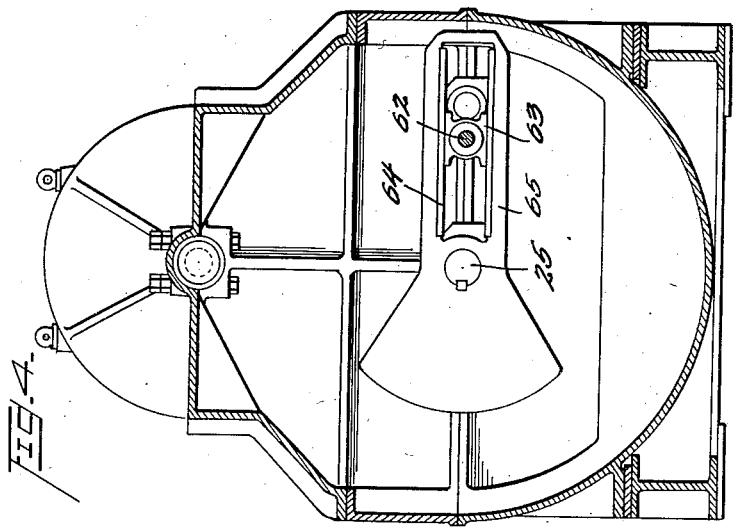
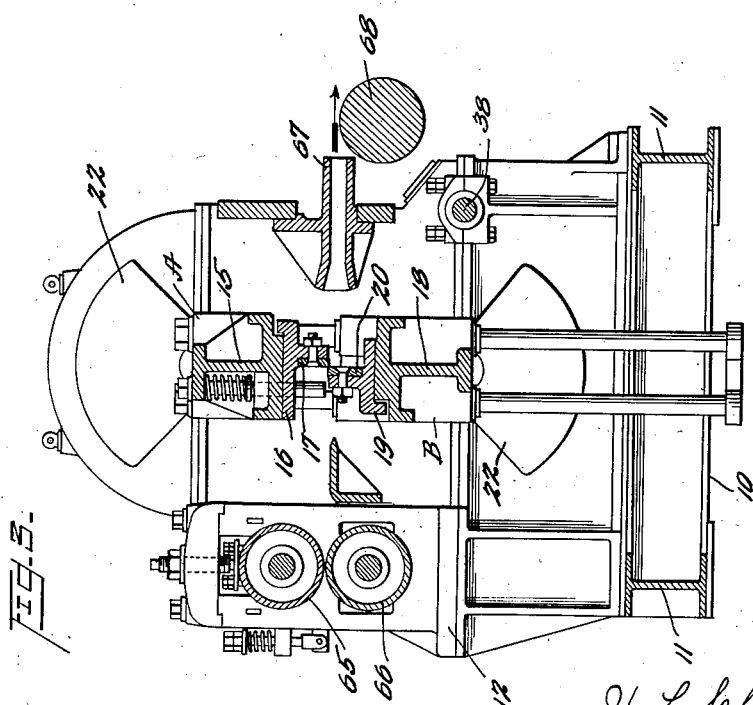
Inventor
H. L. Schreck
By Watson, Coit, Morse & Grindle
Attorneys Patented Dec. 12, 1933

1,939,140

UNITED STATES PATENT OFFICE 1,939,140

FLYING SHEARS

Hans L. Schreck, Easton, Pa., assignor to Treadwell Engineering Company, Easton, Pa., a corporation of Pennsylvania Application July 8, 1932. Serial No. 621,491

4 Claims. (Cl. 164—66)

This invention relates to shearing mechanisms and particularly to shears for severing into units of desired length an oncoming continuously moving blank, shears of this type being commonly designated "flying shears."

The invention furthermore particularly relates to flying shears of the type in which the shearing members are adapted to move relatively to each other in a plane normal to the direction of movement of the blank, these members being bodily moved by the driving mechanism in circular paths about fixed parallel axes, although in opposite directions, each such member being in shearing relationship to the other member only while it travels through a relatively small arc of rotation. Guide means carried by the shearing members themselves is intended to insure that relative movement of these members occurs only in a common plane. This type of shearing apparatus is particularly useful where it is desired to cut relatively wide blanks into units, the mechanism thus including shearing members of considerable length, each such member being, of course, longer than the blank is wide.

Power for operating mill machinery, particularly flying shears, is generally taken from electric motors, and such motors preferably run at constant speeds, except insofar as their speeds may be manually regulated from time to time, or may increase or decrease slightly by reason of fluctuations in the current supply. The linear speed of travel of the blank through the shear, however, may be decreased or increased for the purpose of decreasing or increasing the lengths of the severed units. It is also greatly to be desired that means be provided whereby the operator may vary within limits the actual speed of the cutting blades while passing along the shearing arcs in order that these blades may be caused to travel, during the instant of shearing, at the same rate of speed as the oncoming blank, thus avoiding buckling or tearing of the metal. It is desirable, therefore, to provide, intermediate the shear driving element and the shearing members themselves, a mechanism for translating the uniform rotatory movement of the driving element into non-uniform circular movement of the shearing members, which mechanism shall be adjustable as desired, so that the speed of movement of the shearing members, while actually cooperating in the shearing operation, may be increased or decreased so as to be exactly the same as the speed of the blank.

The present invention contemplates a novel driving mechanism for shears of the general type just described embodying a minimum number of parts, which parts are so designed and arranged that the shearing members may be driven positively and accurately along their paths of movement from a single source of power, this mechanism including means to apply driving forces at each end of each shearing member.

A driving mechanism of the type contemplated by the invention is particularly useful where wide blanks are to be cut into units inasmuch as it also includes means for insuring that the driving forces imparted to the ends of the shearing members respectively are equal, simultaneously applied, and in proper phase so that there is no distortion of the shearing unit which comprises the shearing members and the guiding means carried thereby. Where the shearing members are relatively long, it is essential not only that they be driven by forces applied at both ends but also that these forces be applied in such manner that the shearing members remain parallel to each other at all times during their movements of revolution.

The invention may have various embodiments, of which that illustrated in the accompanying drawings and which will be hereinafter described in detail is a typical example.

In the drawings:

Figure 1 is a side elevation, partly broken away, of a shear embodying the invention;

Figure 2 is a view looking down on the same, shown partially in plan and partially in section taken generally on line 2—2 of Figure 1;

Figure 3 is a section on line 3—3 of Figure 1;

Figure 4 is a section on line 4—4 of Figure 1; and

Figure 5 is a rather diagrammatic view of a portion of the driving mechanism.

The frame of the shear, generally indicated at 10, includes suitable base members, such as I-beams 11, and end members or pedestals 12. The details of the frame are relatively unimportant and will not be specifically described. The shearing members are indicated at A and B respectively, and each is seen to comprise a horizontally disposed rigid supporting bar, a blade holding member, and a cutting blade, these several elements of the upper shearing member being indicated at 15, 16, and 17 respectively and the corresponding elements of the lower shearing member at 18, 19, and 20. Each shearing member has at its ends a crank pin, one of these pins being indicated at 21, and the several crank pins are carried respectively by counterweighted cranks, one of which is indicated at 22. The cranks are in turn fixed upon the ends of rotatable shafts, the two uppermost shafts being indicated at 23 and 24 and the two lowermost shafts at 25 and 26 respectively, shafts 23 and 24 being coaxial and shafts 25 and 26 being coaxial.

In the operation of the shear, the shafts are driven at the same angular velocities, the upper shafts 23 and 24 being driven in one direction of rotation and the lower shafts 25 and 26 in the opposite direction of rotation. As a result, the shearing members are revolved bodily about parallel axes and, to insure that their relative movements, as they approach and recede from each other, are confined to a common plane normal to the direction of movement of the blank, guiding means is provided. This means comprises essentially spaced guide rods 30 rigidly secured to the upper shearing member and slidably extending through cylindrical apertures in members 31 formed integral with the lower shearing member. As the shearing members move away from each other, rods 30 move upwardly through sleeves 31, and as they approach each other, these rods move downwardly through sleeves 31, all relative movements of the shearing members, however, being maintained in a common plane by reason of the relatively close sliding fit of the rods in the sleeves.

Mounted upon each of shafts 23, 24, 25, and 26 is a gear, these several gears being indicated at 32, 33, 34, and 35 respectively, the teeth of gears 32 and 34 being in mesh and likewise the teeth of gears 33 and 35. Also meshing with gears 34 and 35 are pinions 36 and 37, connected by pinion shaft 38 which, as will be seen from Figure 2, is formed in two sections. One such section is provided with a cup-shaped enlargement 39 into which the slightly enlarged end of the other section extends. An annular wedging ring 40 is adapted to fit closely within the cup-shaped member 39 and to frictionally engage or positively interlock with the end of the shaft section which it encircles. Bolts 41 rigidly secure ring 40 in the position in which it is shown, and in which position the ring 40 constitutes a driving connecton between the two sections of the pinion shaft. The parts are so designed that, when the bolts 41 are loosened, annular ring 40 can be backed out wholly or partially and a relative adjustment of the two shaft sections, and hence a relative adjustment of the angular positions of the two pinions 36 and 37, brought about.

By means of the pinion shaft and pinions just described, rotary motion of gear 34 may be communicated to gear 35 and hence to gear 33 which is in mesh with gear 35, and inasmuch as gear 32 is in mesh with gear 34, it follows that rotation of gear 34 results in simultaneous movements of rotation of the other three gears just mentioned and hence in simultaneous rotation of the several shafts upon which these gears are keyed respectively, the several cranks rigidly fixed upon the inner ends of these shafts, and finally the shearing members themselves, as has been before explained.

In order that the driving forces applied to the shearing members and their associated guide frame shall not tend to twist these members, it is essential that the axes of the several crank pins shall occupy, at all times during the operation of the mechanism, positions in a common plane. As it is difficult to secure this exact arrangement of crank pins during the original erection of the machine and as it is necessary to provide means permitting adjustment from time to time during the life of the machine to realize this desired result, the mechanism is so constructed that each crank pin may be adjusted relatively to the others. It will be seen that gear 32 is formed in two parts, the teeth of this gear being formed upon a rim 32' formed separately from the hub and connected thereto by bolts 70, either the hub or the rim being provided with slots through which these bolts extend so that, by loosening the bolts, the hub of the gear may be rotated slightly relatively to the rim, and hence the position of the crank 21 adjusted, while the teeth of the gear are in mesh with the teeth of the solid gear 34.

It has previously been pointed out that the pinion shaft 38 embodies means whereby the relative angular positions of gears 36 and 37 may be adjusted, and by this means the angular position of gear 35 relative to the angular position of gear 34 may be changed as desired, thereby permitting adjustment of the crank pin associated with gear 35 relative to the crank pins associated with gears 32 and 34. Finally it will be observed that gear 33 is formed similarly to gear 32, its toothed periphery or rim being adjustably secured upon its hub so that the position of the crank associated therewith may be adjusted relatively to the other three cranks. By means of the foregoing mechanism, it is possible to adjust at any time the relative positions of the cranks without dismantling the apparatus or taking the gears out of mesh with each other.

Shaft 25 is driven from a suitable power unit which is not illustrated but which is operatively connected to a shaft 42 through mechanism now to be described. The shaft 42 is supported on the frame in suitable bearings 43 and 44 and has splined thereon the beveled pinion 45. A sleeve 46 integral with pinion 45 and likewise encircling the shaft extends through a stationary sleeve 47 integral with a sleeve 48 rotatably mounted upon a short shaft 49 supported in the frame and disposed at right angles to and just below shaft 42. The teeth of beveled pinion 45 mesh with those of a beveled gear 50 fixed on shaft 49, and hence the motion of rotation of shaft 42 is transmitted to shaft 49. The bearings 51 and 52 which support shaft 49 are mounted in bearing blocks 53 and 54, which are in turn slidably supported in transversely extending guides which permit them to be moved transversely of the frame of the shear. Secured to blocks 53 and 54 are threaded rods 55 and 56 which have interior threaded engagement with sleeves rigid with gears 57 and 58 respectively. These last mentioned gears are so mounted as to be immovable axially, and the teeth of both mesh with the teeth of a third gear 59 which may be rotated manually by means of a hand wheel 60.

It is clear that, by rotating hand wheel 60, bearing blocks 53 and 54 may be simultaneously moved transversely of the machine, these blocks carrying with them shaft 49. The driving connection between shafts 42 and 49 is maintained, however, for all possible lateral adjustments of shaft 49, the pinion 45 being prevented from backing away from or coming out of mesh with gear 50 by reason of the fact that the sleeve 46, integral with pinion 45, is prevented from moving axially by the sleeve 47, which at all times moves with shaft 49.

Fixed upon the inner end of shaft 49 is a crank 61 carrying at one end a crank pin 62 provided with a slide block 63 which is adapted to move in a slot 64 formed in a second crank 65 rigidly secured to the end of shaft 25. Shafts 49 and 25 being out of alignment, as shown clearly in Figure 2, it follows that the uniform rotatory motion of shaft 49 will be translated into non-uniform rotary motion of shaft 25 in well-known manner. It is furthermore apparent that, by manipulating hand wheel 60, the amount of disalignment of these shafts may be increased or decreased as desired. The shafts may even be brought into alignment, in which event shafts 25 and 49 will move at the same uniform speed. If desired, for this mechanism may be substituted some other mechanism, such, for instance, as elliptical gears, whereby the uniform rotary motion of the driving element may be translated into non-uniform rotary motion of the driven shaft for the general purpose as aforesaid of modifying the angular velocity of the shearing members at the instant of shearing.

In Figure 3 the positions of the feed rolls are shown, these rolls being indicated by the numerals 65 and 66, and also the guide 67 and one of the delivery rolls 68. Inasmuch as these elements comprise no part of my invention, they need not be specifically described.

From the foregoing it is clear that I have provided a shear for the severing of units from an oncoming blank which may have a very considerable width, both ends of each shearing element being positively driven and the driving means permitting fine adjustments to be made, insuring that no strains will be imposed by the driving mechanism on the shearing members and its guiding frame, tending to distort these members and disrupt and thereby interfere with the accuracy of their operations in cutting or to increase the frictional forces between the shearing members and the guide means. It is likewise apparent that, by the construction adopted, a single means for translating uniform rotary motion into non-uniform rotary motion is provided, the use of a means of this nature at both ends of the machine being avoided. The mechanism is compact and easily assembled and contains a minimum number of parts for the accomplishment of the desired functions.

Having thus described the invention, what is claimed as new and desired to be secured by Letters Patent is:

1. In a shear, in combination, two spaced coaxial gears, cranks operatively connected to said gears respectively, a shearing member carried by said cranks, two additional coaxial gears intermeshing respectively with said first mentioned gears, cranks operatively connected to said last mentioned gears respectively, a second shearing member carried by said last named cranks, means operatively connecting two of the spaced gears for simultaneous rotation, means for securing relative angular adjustment of said interconnected gears, and means for driving one of said gears.

2. In a shear, in combination, two spaced coaxial gears, cranks operatively connected to said gears respectively, a shearing member carried by said cranks, two additional coaxial gears intermeshing respectively with said first mentioned gears, cranks operatively connected to said last mentioned gears respectively, a second shearing member carried by said last named cranks, a shaft having pinions thereon for operatively connecting two of the coaxial gears for simultaneous rotation, said shaft being formed in two parts adjustably secured together whereby said interconnected gears may be angularly adjusted relatively to each other, and means for driving one of said gears.

3. In a shear, in combination, two spaced coaxial cranks positioned at opposite ends of a shearing member and adapted to support and revolve said member, two additional coaxial cranks for carrying and revolving a second shearing member about an axis parallel to the axis of rotation of said first mentioned cranks, a source of power, and means connecting said cranks to said source of power, said means including elements permitting relative angular adjustment of said cranks.

4. In a shear, in combination, upper and lower cooperating shear knives, a crank disposed at each side of each of said knives and operatively connected therewith, a gear operatively connected to each of said cranks, said gears being arranged in pairs, each pair being associated with one of said shear knives and meshing respectively with the gears of the other pair, driving means connected to one of said gears, means connecting the gears of one of said pairs for simultaneous rotation, means associated with said connecting means for adjusting the relative angular position of the gears on opposite sides of said knives, and means associated with a gear on each side of said shear for adjusting the relative angular position of the cranks on the same side of the shear.

HANS L. SCHRECK.